United States Patent [19]

Seeber et al.

[11] Patent Number: 4,781,164

[45] Date of Patent: Nov. 1, 1988

[54] FUEL INJECTION SYSTEMS FOR INTERNAL COMBUSTION ENGINES

[75] Inventors: Kenneth P. Seeber, Wanneroo; Wayne R. Gilbert, City Beach; Christopher K. Schlunke, Kingsley, all of Australia

[73] Assignee: Orbital Engine Company Proprietary Limited, Balcatta, Australia

[21] Appl. No.: 99,017

[22] Filed: Sep. 21, 1987

[30] Foreign Application Priority Data

Sep. 23, 1986 [AU] Australia ............................. PH 08154
Mar. 13, 1987 [AU] Australia ............................. PI 0841

[51] Int. Cl.⁴ .................................................. F02B 3/00
[52] U.S. Cl. ...................................... 123/533; 123/531
[58] Field of Search ........................ 123/531, 533, 534

[56] References Cited

U.S. PATENT DOCUMENTS

| | | | |
|---|---|---|---|
| 1,613,618 | 1/1927 | Müller | 123/533 |
| 2,710,600 | 6/1955 | Nallinger | 123/533 |
| 4,224,915 | 9/1980 | Emmenthal et al. | 123/533 |
| 4,543,939 | 10/1985 | Ehrhart et al. | 123/533 |
| 4,554,945 | 11/1985 | McKay | 123/533 |
| 4,556,037 | 12/1985 | Wisdom | 123/533 |
| 4,628,888 | 12/1986 | Duret | 123/533 |
| 4,674,462 | 6/1987 | Koch et al. | 123/533 |

*Primary Examiner*—Raymond A. Nelli
*Attorney, Agent, or Firm*—Armstrong, Nikaido, Marmelstein & Kubovcik

[57] ABSTRACT

A method of fuel injection for an internal combustion engine having one or more combustion chambers and wherein a metered individual quantity of fuel entrained in a gas charge is injected individually by the pressure of the gas directly into each combustion chamber each combustion cycle thereof. The method including the steps of delivering gas from at least one combustion chamber of the engine to a common gas reservoir, and controlling said delivery of gas to the gas reservoir to substantially maintain the gas therein at a pressure above the maximum compression pressure in the combustion chamber prior to commencement of combustion in said combustion chamber. Supplying gas at a regulated pressure from said gas reservoir to receive the metered quantity of fuel and effect in sequence delivery of that fuel into the respective combustion chambers of the engine.

30 Claims, 6 Drawing Sheets

FUEL INJECTION SYSTEMS FOR INTERNAL COMBUSTION ENGINES

This invention relates to fuel injection systems, as used in internal combustion engines, of the type wherein a metered quantity of fuel is delivered to the engine by entraining the fuel in a gas or otherwise applying a gas under pressure to the fuel.

Fuel injection systems of this type have previously been proposed wherein a compressor driven by the engine provides the source of gas under pressure to effect injection of the fuel to the engine. Although the provision of a compressor to provide the source of gas has no major functional disadvantage, the compressor represents a significant cost component both from the point of view of manufacture and installation. This consideration is of particular significance in regard to fuel injection systems to be incorporated in high volume mass produced engine installations such as engines for automotive or outboard marine use.

Independent compressors also require the provision of appropriate lubrication systems and drive transmissions from the engine that further contribute to manufacturing and installation costs and, to a lesser degree, to increased reliability risks and servicing costs. They normally need to be mounted on the exterior of the engine with a suitable drive connection to the engine crankshaft or camshaft, such as by a belt drive. This arrangement usually undesirably increases the overall dimension of the engine assembly, which is an undesirable feature, particularly in automotive and outboard marine installations.

There is disclosed in U.S. Pat. No. 2,134,786 to Ivan P. Haring a two stroke cycle spark ignited engine wherein exhaust gas, extracted from the engine cylinders, is used to assist in vapourising the fuel and convey the fuel to the engine through an associated manifold. Respective cam controlled fuel inlet valves are provided to regulate the delivery of the vapourised fuel from the manifold to the respective cylinders of the engine. A fan-forced air supply is provided to promote effective scavenging of the cylinder, and the fuel inlet valve is opened, to provide the vapourised fuel delivery to the cylinder, once the piston has effected closure of both the air inlet port and exhaust port.

Although the Haring specification does establish a supply of gas under pressure by extracting exhaust gas from the engine cylinder prior to opening of the exhaust port, that extracted exhaust gas is primarily used as a heat source to vapourise the fuel in the carburettor device and to maintain the vapourised fuel at a relatively low pressure in the manifold. The pressure in the manifold is only required to be sufficient to cause the fuel vapour to flow into the engine cylinders against the pressure existing therein from the fan-forced scavenging after the closure of the air inlet and exhaust ports.

It will be noted from FIG. 5 of the Haring specification that the fuel inlet valve is opened immediately the air inlet and exhaust ports have closed, and thus there is only a relatively low pressure in the cylinder at this point in the engine cycle. It is also to be noted that the valve controlling the flow of exhaust gas from the engine cylinder into the storage reservoir is open during the power stroke of the engine, and FIG. 8 clearly indicates that the valve is opened relatively late in the power stroke. Accordingly, it is further evident that the exhaust gas used to vapourise the fuel in the carburettor device is at a relatively low pressure.

It is evident, from a number of aspects of the design of the fuelling system proposed by Haring, that the vapourised fuel enters the engine cylinder at a comparatively low pressure and accordingly is not suitable for incorporation in a direct in-cylinder fuel injection system of a modern engine, where the fuel is delivered to the engine cylinder relatively late in the compression stroke when the pressure of the gas in the cylinder is quite high. In this regard, it must firstly be noted that as the exhaust gas is passed back to the carburettor device and then into the fuel delivery manifold, the exhaust gas passes in sequence through two throttling devices to increase the velocity of the exhaust gas and thus promote better mixing of the gas with the fuel and the vapourising of the latter. However, there is also a substantial pressure drop in the exhaust gas through each of these throttling devices and so the pressure of the gas and fuel vapour available at the point of delivery to the engine cylinder is substantially below the pressure at which the exhaust gas is withdrawn from the engine cylinder. Further, it is to be noted that the exhaust gas is withdrawn during the power stroke of the engine and, as previously referred to, the exhaust gas is withdrawn relatively late in the power stroke and would hence be at a relatively low pressure before passing through the throttling devices.

In regard to the timing of the withdrawal of the exhaust gas within the engine cycle, it is to be considered that in view of the use of a cam operated poppet valve to achieve the extraction of the exhaust gas, the characteristics of that mechanism necessitate the exhaust withdrawal valve being open for a significant period of time, and accordingly substantial power loss would be incurred if the withdrawal of the exhaust gas occurred during a period of maximum or high pressure in the cylinder. This is another reason why the Haring proposal would rely on the exhaust withdrawal valve being opened late in the expansion or power stroke of the engine. Further in this regard, it would be recognised that the temperature of the gases in the cylinder immediately following ignition, when high pressures exist in the cylinder, would be such that the poppet valve controlling the withdrawal of the exhaust gas should not open whilst the gas was at such high temperatures, as gas at that temperature flowing past the poppet valve could rapidly render that valve inoperable.

It is the object of the present invention to provide a method and apparatus for the injection of fuel into a combustion chamber of an internal combustion engine by a gas charge wherein a conventional type compressor is not required as a means of providing the supply of gas to effect the injection of the fuel, the method and apparatus being effective in service and less expensive to manufacture and install than currently known systems.

With the above stated object in view there is provided according to the present invention a method of fuel injection for an internal combustion engine having one or more combustion chambers and wherein a metered quantity of fuel is delivered to the engine entrained in a gas charge, the method including the steps of delivering gas from at least one combustion chamber of the engine to a gas reservoir, controlling said delivery of gas to said gas reservoir to substantially maintain the gas in said gas reservoir above a predetermined pressure, and supplying gas at a regulated pressure below said predetermined pressure from said gas reservoir to effect delivery of fuel to the engine.

Conveniently communication between the gas reservoir and the combustion chamber is established when the gas pressure in the combustion chamber is above said predetermined pressure by a selected amount. A fixed or variable flow area orifice or orifices may be provided to establish a pressure differential between the gas in the combustion chamber and the gas available to the gas reservoir. The fixed area orifice or orifices may establish an initial pressure drop from the gas pressure in the combustion chamber, while regulation of the pressure at the reservoir is controlled by a variable flow demand regulator. Where a variable area orifice or orifices is provided the regulation of the pressure in that reservoir may be controlled wholly by variation of that orifice area.

In one embodiment the gas is initially delivered from the combustion chamber through a controlled orifice to an intermediate chamber, and gas from that intermediate chamber is transferred to the gas reservoir as required to maintain said predetermined pressure in the gas reservoir.

In a modification of the above method the pressure of the gas from the combustion chamber is applied to compress a charge of air that is delivered via a regulator to the gas reservoir. The air charge is preferably located in a compression chamber to which gas from the combustion chamber is cyclicly admitted to effect compression of the air. The air may be supplied to the compression chamber from the crankcase of the engine wherein the air is compressed to a minor degree by the reciprocation of an engine piston. An arrangement of one-way valves may be provided whereby between each admission of gas from the combustion chamber to the compression chamber, the compression chamber is purged of gas from the combustion chamber so that there is not an accumulation of combustion chamber gas within the compression chamber.

There is also provided by the present invention a method of fuel injection for an internal combustion engine having one or more combustion chambers and wherein a metered quantity of fuel entrained in a gas charge is injected directly into each combustion chamber each combustion cycle thereof by the pressure of the gas charge, the method including the steps of delivering gas from at least one combustion chamber of the engine to a gas reservoir, controlling said delivery of gas to said reservoir to substantially maintain the gas in said reservoir above a pressure sufficient to effect direct injection of the fuel into the combustion chambers of the engine, and supplying gas at a regulated pressure from said gas reservoir to effect the delivery of the fuel into the combustion chambers.

Preferably said predetermined pressure in the gas reservoir is above the maximum pressure developed in the combustion chamber prior to the ignition of the compressed fuel-air charge. The pressure in the combustion chamber rises further after ignition.

The maintenance of a high pressure in the gas reservoir, and the use of a lower regulated pressure for delivery of the fuel, reduces the actual pressure loss in he combustion chamber as a result of the extraction of gas for use in delivery of fuel. This reduction in the pressure loss in the combustion chamber correspondingly reduces the consequential loss in engine power output. There is also a reduction in the time interval during which gas flows from the combustion chamber to the gas reservoir and so the components in the path of this flow are exposed for a minimum period to the high temperature combustion gases. Accordingly the effective operation and durability of these components are enhanced.

It is also to be understood that, in modern electronically controlled fuel injected engines, the maximum combustion chamber pressure can occur at differing points in the cycle depending on factors such as injection timing and ignition timing which may be varied with engine load and speed. The presently proposed fuel injection system extracts gas from the combustion chamber on the basis of pressure conditions and is thus not in a fixed time relation to the engine cycle.

In addition to the above discussed fuel injection method, the present invention also provides a fuel injection system for an internal combustion engine comprising fuel metering means adapted to prepare a metered quantity of fuel in accordance with the engine fuel demand, means to selectively deliver said metered quantity of fuel to the engine entrained in a charge of gas supplied from a gas reservoir, means to supply gas to said gas reservoir from at least one combustion chamber of the engine, means to control the supply of gas to said reservoir from the combustion chamber to substantially maintain a pressure therein above the pressure required to effect delivery of the fuel to the engine, and means to supply gas from the gas reservoir at a regulated pressure to effect delivery of the fuel to the engine.

Conveniently a valve controlled orifice is provided through which communication is established between the reservoir and the engine combustion chamber. The valve is preferably arranged to open in response to a pressure differential across the valve. Preferably the pressure differential is selected so the valve opens when the gas in the combustion chamber is near the maximum pressure attained per engine cycle, that maximum pressure being developed after ignition of the fuel charge in the combustion chamber has been effected. Conveniently the degree of opening of the valve is variable so as to control the pressure differential between the combustion chamber and the reservoir as the pressure in the reservoir increases.

In one embodiment the fuel is injected into the combustion chamber through a valve controlled fuel port located in the end of a nozzle body having an axial fuel passage extending therethrough. The gas reservoir is formed by an annular cavity in the nozzle body located co-axially around the fuel passage. A plurality of orifices are arranged in a circular formation about the fuel port to provide communication between the annular cavity and the combustion chamber. A regulator sleeve is slidably located co-axially in the cavity having a first annular surface directed toward the plurality of orifices and a second annular surface oppositely directed. The second surface is of a greater area than that area of the firs surface which is exposed to the orifices when the first surface is urged against them. A spring or like resilient means is interposed between the nozzle body and the sleeve in a stressed state to urge the sleeve to move in a direction opposite to that which the gas pressure in the cavity acting on the second surface would induce the sleeve to move.

In the above described construction the cavity surrounding the fuel passage is the gas reservoir, and the first surface of the sleeve directly, or through a sealing ring co-operates with the orifices to selectively open and close same. The pressure of the gas in the cavity acts on said second surface of the sleeve to resist movement of the sleeve in a direction to open the orifices and permit gas to enter the cavity from the engine combustion chamber. The force arising from the stressed springs, and the combustion chamber gas pressure acting on the first surface of the sleeve, combine to promote movement of the sleeve in the direction to open the orifices and permit gas to enter the cavity. Thus the resultant effects of the respective gas pressures acting on the first and second surfaces of the sleeve, and the spring force acting on the sleeve, regulate the pressure of the gas in the cavity at a predetermined value below the gas pressure in the combustion chamber.

The invention will be more readily understood from the following description of several embodiments of the method and apparatus for delivering fuel to an internal combustion engine, with reference to the accompanying drawings.

Figure 1:
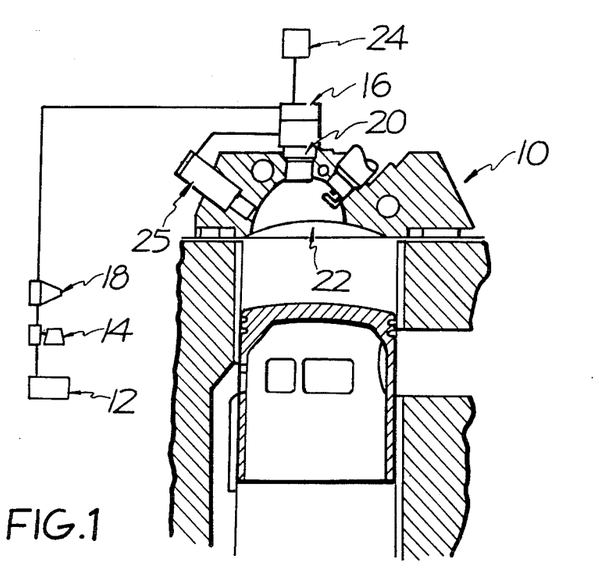
FIG. 1 is a schematic representation of the fuel delivery system.

Referring now to FIG. 1 a typical fuel delivery system for the internal combustion engine 10 comprises a fuel reservoir 12, a fuel pump 14 supplying fuel to the fuel metering unit 16, at a pressure set by the regulator 18. Metered quantities of fuel are supplied to the injection unit 20 for delivery to the combustion chamber 22 of the engine. The quantity of fuel delivered is determined by the electronic processor 24 which receives input from the engine 10 indicative of the engine fuel demand.

Injection of the metered quantity of fuel is effected by entraining the fuel in a gas at a pressure sufficient to deliver the fuel into the engine combustion chamber against the working pressure therein. The gas is provided by the extraction and storage unit 25 which develops a reservoir of gas at a regulated pressure by extraction of gas from the engine combustion chamber when it is at a pressure above the regulated gas pressure.

The control of the application of the gas pressure to the fuel, and the timing of the delivery of the fuel to the engine, is effected by the processor 24.

Further information in regard to the construction and operation of a typical fuel metering unit and injector unit suitable for use in the above described fuel delivery system is disclosed in International Patent Application Nos. PCT/AU84/00150 and PCT/AU85/00176, and corresponding U.S. patent application Nos. 740,067 and 849,501, respectively, the disclosures in each of which are hereby incorporated in this specification by reference.

Figure 2:
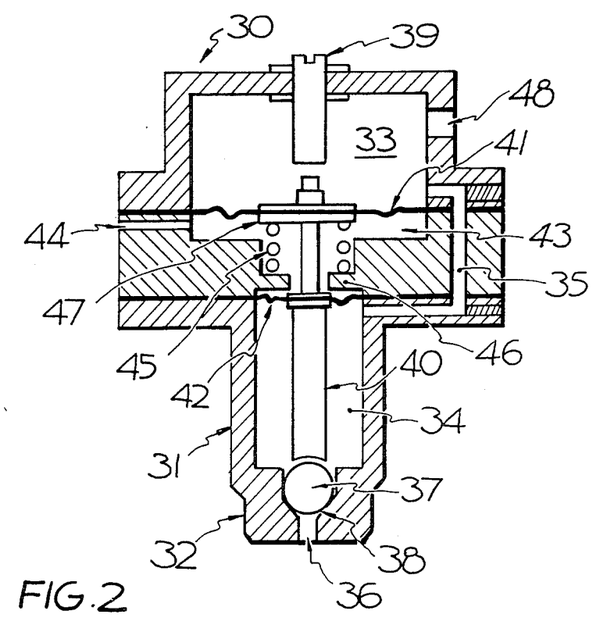
FIG. 2 is a sectional view of a first embodiment of the gas extraction and storage unit.

FIG. 2 of the drawings shows one embodiment of the gas extraction and storage unit 30 as indicated generally at 25 in FIG. 1. The unit as shown in FIG. 2 comprises a body 31 having a cylindrical externally threaded end portion 32 to co-operate with a threaded aperture in the cylinder head of the engine. Internally the body 31 has a gas reservoir chamber 33 and a receiver chamber 34 which are in communication with one another via the passage 35.

The receiver chamber 34 has a port 36 to provide communication between the receiver chamber 34 and the combustion chamber of the engine. The ball 37 co-operates with the conical seat 38 to isolate the receiver chamber 34 from the engine combustion chamber 22 when the ball 37 is in engagement with the seat 38. The ball 37 may lift off the seat 38, as hereinafter described, to permit gas to pass from the combustion chamber through the port 36 into the receiver chamber 34.

The control rod 40 is located co-axially with the port 36 and ball 37 and is supported by the upper and lower diaphragms 41 and 42 located in the reservoir chamber 33 and receiver chamber 34 respectively. The cavity 43 located between the upper and lower diaphragms is vented at 44 to atmosphere, and houses the compression spring 45 located between the shoulder 46 on the body 31 and the flange 47 on the rod 40.

The port 48 is connectable by a suitable coupling and line to a solenoid valve incorporated in the injector unit 20 to control the flow of gas in the fuel injector unit 20 to inject the fuel to the engine.

It will be appreciated that, with the pressure in chambers 33 and 34 equal, as the area of diaphragm 41 is greater than that of diaphragm 42 there would be a net force acting downwardly on the rod 40 that is counteracted by the upward force applied by the spring 45 to the flange 47 on the control rod 40. Accordingly, when the pressure in the chambers 33 and 34 is lower than a preset value, determined by the size of diaphragms 41 and 42 and the characteristics of the spring 45, the control rod 40 will be raised by the spring 45, thereby permitting the ball 37 to rise and increase the size of the flow passage through the port 36, when the pressure in the engine combustion chamber is above that in the chamber 34. However, as the pressure in the chambers 34 and 33 rises, the control rod 40 will move downwards so as to limit the degree of opening of the port 36. The adjustable stop screw 39 limits the maximum opening of the port 36.

This construction has the advantage that the ball 37 is always in contact with either the seat 38 or the rod 40 to thereby provide a path for the conduction of heat away from the ball to maintain an acceptable temperature. In addition the difference in areas of the diaphragms 41 and 42 enable the port 36 to open sufficiently to permit the required quantity of gas to pass into the chambers 33 and 34 during the short time period that the high pressure conditions exist in the combustion chamber. This has an advantage in minimising the power loss from the engine.

Figure 3:
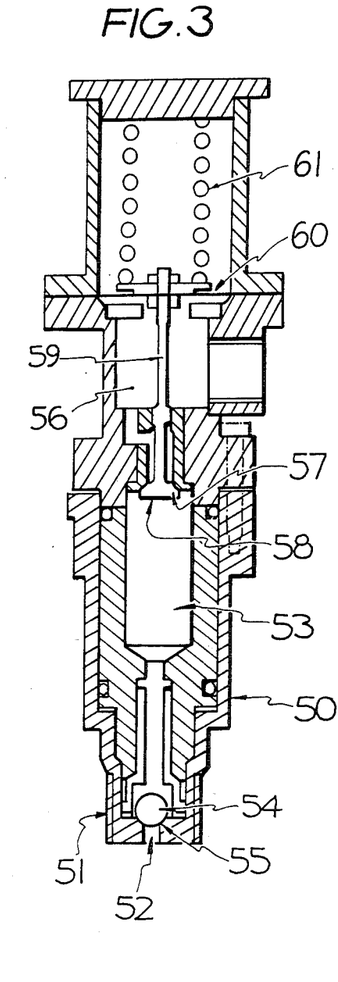
FIG. 3 is a sectional view of a second embodiment of the gas extraction and storage unit.

FIG. 3 of the drawings shows an alternative construction for the gas extraction and storage unit 25 of FIG. 2 comprising a body 50 with a threaded cylindrical end portion 51 to be screwed into the threaded aperture in the cylinder head. The port 52 controls communication between the combustion chamber of the engine and receiver chamber 53 by means of the ball valve 54 co-operating with the seat 55. The ball 54 has a fixed open position determined by the shoulder 63, and accordingly will fully open the port 52 whenever the pressure in the chamber 53 is lower than the pressure in the combustion chamber of the engine. The gas storage chamber 56 receives gas from the receiving chamber 53 via the port 57 controlled by the valve 58. The valve 58 is connected by the rigid stem 59 to the diaphragm 60 that is subject on one side to the gas pressure in the chamber 56 and on the opposite side to the combined action of the compression spring 61 and atmospheric pressure in tis vented enclosure.

In this construction, gas is maintained in the receiving chamber 53 substantially at the maximum pressure in the engine combustion chamber, and gas is drawn therefrom as required into the gas storage chamber 56 to maintain the required pressure therein as set by the regulator spring 61. The storage chamber 56 is coupled as previously discussed with the solenoid valve in the fuel injection unit to provide the gas for injection of the fuel to the engine in appropriate time relation to the engine cycle.

Figure 4:
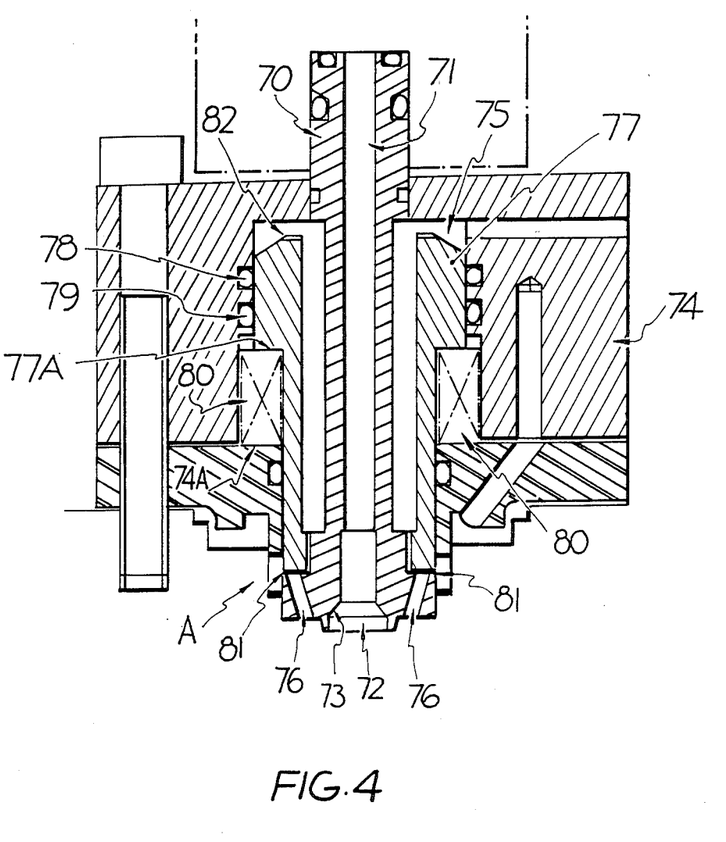
FIG. 4 is a sectional view of a third embodiment of the gas extraction and storage unit.

FIG. 4 of the drawings depicts a further alternative construction wherein the gas extraction and storage unit is incorporated integrally with the fuel injector nozzle. The injector nozzle stem 70 has a central bore 71 therethrough terminating at the lower end with a port 72 and a poppet valve seat 73. The stem 70 passes through the housing 74 and defines therewith an internal cavity 75. The series of orifices 76 are spaced circumferentially around the port 72 to communicate the engine combustion chamber with the cavity 75 to permit gas to flow from the combustion chamber into the cavity 75.

The regulator sleeve 77 is slidably supported in the cavity 75 with seals 78 and 79 preventing the passage of gas between the external surface of the regulator sleeve 77 and the mating surfaces of the body 74. The series of springs 80 are located in the recess between the regulator sleeve 77 and the body 74 and engage respective shoulders 77a and 74a thereon so that the regulator sleeve 77 is urged upwardly as viewed in the drawing by the springs 80.

The lower end of the regulator sleeve 77 presents a lower annular face 81 which is exposed to the gas pressure in the engine combustion chamber. The upper end of the regulator sleeve presents an upper face 82 of greater area than the lower face 81, and is exposed to the pressure of the gas in the cavity 75. Accordingly, when the force arising from the combined effect of the combustion chamber gas pressure acting on the lower face 81 and the springs 80 is greater than the force created by the gas pressure in the cavity 75 acting on the upper face 82, the regulator sleeve 77 will rise thus opening the orifices 76 to permit gas to pass from the combustion chamber into the gas storage chamber 75. Upon the pressure in the chamber 75 rising sufficiently to overcome the combined force on the lower face 81 and the effects of the springs 80-, the regulator sleeve 77 will move downwardly to close the orifices 76.

Figure 4A:
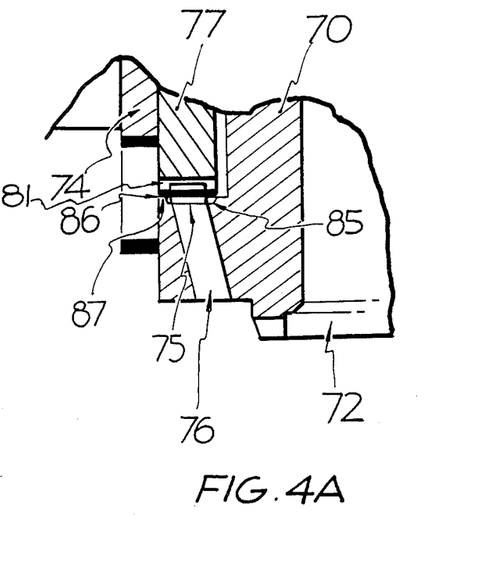
FIG. 4A is an enlarged view of the area A indicated in FIG. 4.

The enlarged fragmentary view FIG. 4A shows in more detail the construction of the lower end of the regulator sleeve 77 and the orifices 76. The series of orifices 76 each communicate with an annular groove 85 extending continuously in a concentric relationship around the central bore 71 in the injector stem 70. The rigid annular ring 86, which functions in the manner of a check valve, is also continuous and concentric with respect to the axis of the bore 71, and seats on the annular lands 87 located inwardly and outwardly of the annular groove 85. The lower annular face 81 of the regulator sleeve 77 abuts the annular ring 86 to hold the latter in sealing relationship to close the annular groove 85. when the pressure in the chamber 75 reduces sufficiently below the regulated pressure the pressure in the annular groove 85, being the pressure of the gas in the combustion chamber, will lift both the sealing ring 86 and the regulator sleeve 77 to permit the gas to enter the cavity 75. Upon the pressure in the chamber 75 again rising to the regulated pressure, the sleeve 77 and the sealing ring 86 move down to close the annular groove 85.

In each of the previously described constructions gas is withdrawn from the combustion chamber for use in effecting injection of the metered quantity of fuel. However in the construction shown in FIG. 5 the gas from the combustion chamber is used as a pressure source to compress a fresh air charge to be used for delivering the metered quantity of fuel. This construction has the advantage that the gas as used for injection of the fuel does not include contaminants from the combustion chamber and in particular products of combustion which may give rise to corrosion problems within the injector. It is described as particularly adapted to use on two stroke cycle engines, although it may be adapted to other engines as well.

Figure 5:
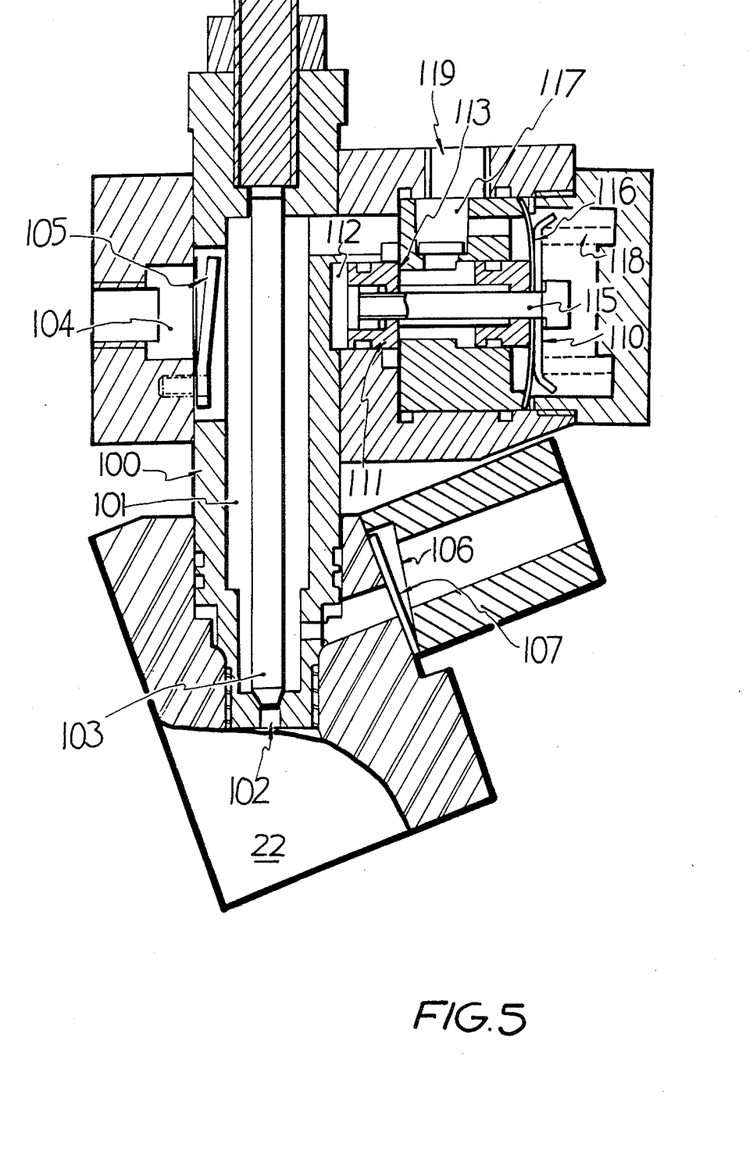
FIG. 5 is a sectional view of a fourth embodiment of the gas extraction and storage unit.

The construction shown in FIG. 5 comprises a body 100 having a compression chamber 101 which is in communication with the engine combustion chamber through the orifice 102. In the construction shown, the area of the orifice may be varied by the adjustment rod 103, however in particular installations adjustment may not be required and the orifice 102 can be made to the appropriate size for the particular engine.

The compression chamber 101 communicates with the crankcase of the engine via the port 104 and the reed valve 105 which opens in response to the pressure in the crankcase rising above that in the compression chamber 101. The gas purge port 106 also communicates with the compression chamber 101 and is controlled by the reed valve 107. The reed 107 is designed so that the port 106 remains open when the pressure drop through the port is low but closes upon the increase of the pressure drop above a predetermined value. The reed 107 is designed so that when the compression chamber 101 is only subject to the pressure of the air supply from the engine crankcase, the port 106 will remain open and thereby purge gas from the compression chamber 101. However, upon the pressure in the chamber 101 rising as a result of gas entering from the engine combustion chamber, the pressure drop across the reed 107 will increase and cause the reed to close the purge port 106.

The pressure regulator assembly 110 comprises a valve element 111 slidably supported in the bore 112 to sealably engage or disengage from the regulator seat 113. The valve element 111 is coupled by the rod 115 to the diaphragm 116 which is subjected to the pressure of the gas in the chamber 117 on one side and to a regulating force induced by atmospheric pressure and the spring 118 on the opposite side. When the pressure in the chamber 117 falls below the regulated pressure, the valve element 111 is moved out of engagement with the seat 113 to communicate chamber 101 with chamber 117 through the annular port 120. The chamber 117 is coupled to the fuel injector via the port 119 and an appropriate conduit to supply gas to the injector as required. The check valve 114 prevents reverse flow from chamber 117 to chamber 101 when the port 120 is open.

When used on a crankcase scavenged two stroke cycle engine, this form of the invention operates as follows:

When the piston of the engine is on the down (expansion) stroke, that is moving towards bottom dead centre, the pressure of the air in the engine crankcase will rise and deliver air into the compression chamber 101 via the port 104. This will cause the compression chamber 101 to be filled with air. On the compression stroke of the piston of the engine, that is when the piston is moving towards top dead centre, the compression pressure in the engine combustion chamber will cause gas from the combustion chamber to pass through the orifice 102 into the compression chamber 101.

The pressure in the chamber 101 will then be sufficient to cause the reed valve 107 to close the purge port 106 and also the reed 105 to close the air inlet port 104. As the pressure in the combustion chamber rises further the gas entering the compression chamber 101 will compress the charge of air therein so that high pressure air is available to pass the regulator valve element 111 and enter the chamber 117. This flow of air will of course only occur if the pressure in the chamber 117 is below the regulated pressure.

During the subsequent expansion stroke in the engine the pressure will again fall in the compression chamber 101 and the next delivery of air from the crankcase will enter the chamber 101 and displace through the purge port 106 the gas which previously entered from the combustion chamber. The compression chamber 101 is thus again filled with a fresh charge of air and the cycle above described is repeated.

It will be appreciated from the above description that the gas entering the chamber 101 from the engine cylinder is purged therefrom during each cycle so that the compressed air passing to the chamber 117 and subsequently available to the injection system is not contaminated with products of combustion from the engine cylinder.

Alternatively, if desired, a mixture of air from the engine crankcase and gas from the combustion chamber may be compressed in the compression chamber 101 for delivery to the chamber 117. The ratio of air and gas from the combustion chamber may be controlled to a fixed ratio by appropriate sizing of the orifice 102 and an additional orifice (not shown) incorporated in the port 104. If desired provision may be made to adjust the size of at least one of these orifices, by for example adjustment rod 103, to vary the ratio of air to combustion chamber gas. The adjustment may be in response to engine operating conditions.

The embodiment described with reference to FIG. 5 is for use in an engine operating on a two stroke cycle wherein air is normally compressed in the crankcase for delivery to the combustion chamber, and thus air can be conveniently bled from the crankcase for entry to the compression chamber 101. However in other engines provision may be made for air at an appropriate pressure to be available for supply to the chamber 101.

Each of the embodiments of the gas extraction and storage unit described with reference to FIGS. 2 to 5 respectively provide gas at the required pressure for effecting injection of the fuel to the engine without the construction and operational disadvantages related to operation of a conventional type compressor. These gas extraction and storage units may be incorporated in engines intended for a wide range of use including vehicles of all types such as automobiles and marine craft including outboard engines.

In multi cylinder engines an individual gas extraction and storage unit may be provided for each cylinder and provide gas to the fuel injector for that particular cylinder only or each unit may deliver compressed gas to a common reservoir that in turn provides gas to the injector of each cylinder. Otherwise only one or some of the cylinders may be fitted with extraction and storage units as previously described which deliver to a common reservoir from which all injectors are supplied. In yet another alternative arrangement the compressed gas from one cylinder is used to provide gas to another cylinder of the same engine, preferably the two particular cylinders operating with combustion cycles out of phase with each other.

The above described method and apparatus may be used in fuel injection systems applicable to a wide range of internal combustion engines operating on either the two or four stroke cycle and those engines may be for vehicle or marine use, including automobile engines and outboard marine engines.

In the embodiments previously described with respect to FIGS. 1 to 5 of the accompanying drawings, pressure regulation means have been incorporated within the device provided for the or each cylinder.

In a multi-cylinder engine, considerable cost and complication can be avoided by omission of individual regulating means in each device and providing a single regulating means that controls the supply of gas from all of the devices to a common reservoir with each fuel injector for each cylinder receiving compressed gas from the common reservoir. In one form, the gas drawn from each cylinder is delivered to a common conduit or reservoir, and the gas is supplied therefrom to each injector, the pressure of the gas supplied being controlled by a single regulator means.

Figure 6:
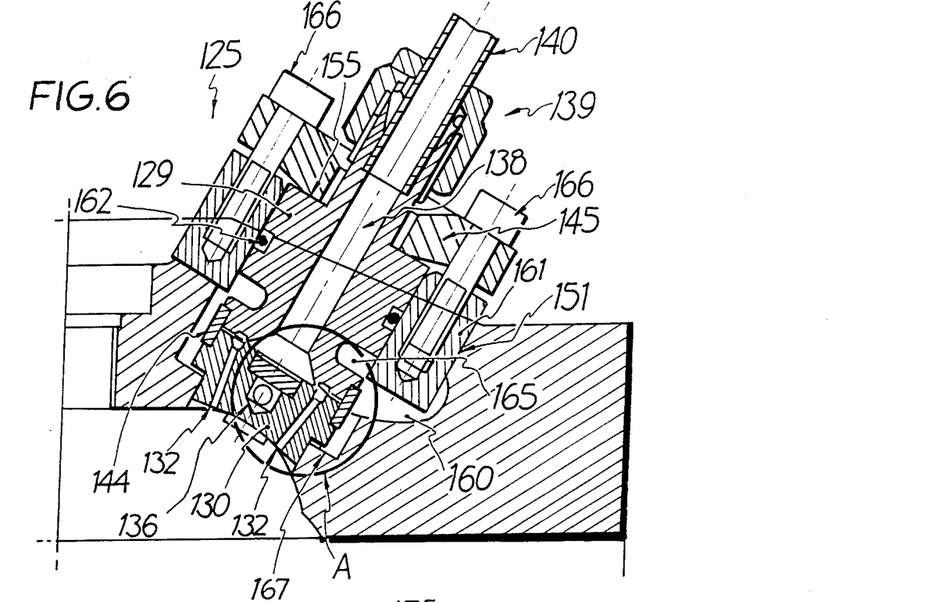
FIG. 6 is a view of part of a cylinder head of an engine, with a gas extraction device fitted thereto shown in longitudinal section.
Figure 7:
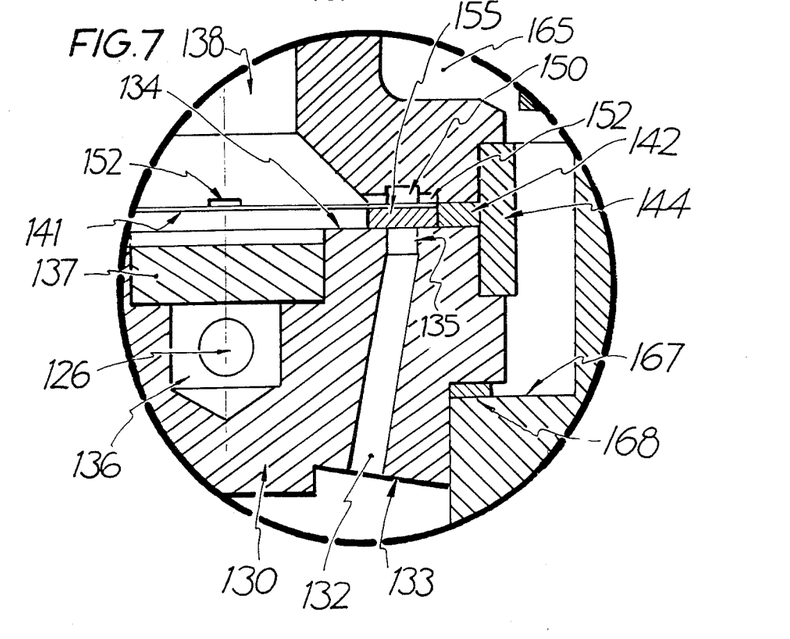
FIG. 7 is an enlargement of a portion A of FIG. 6.
Figure 8:
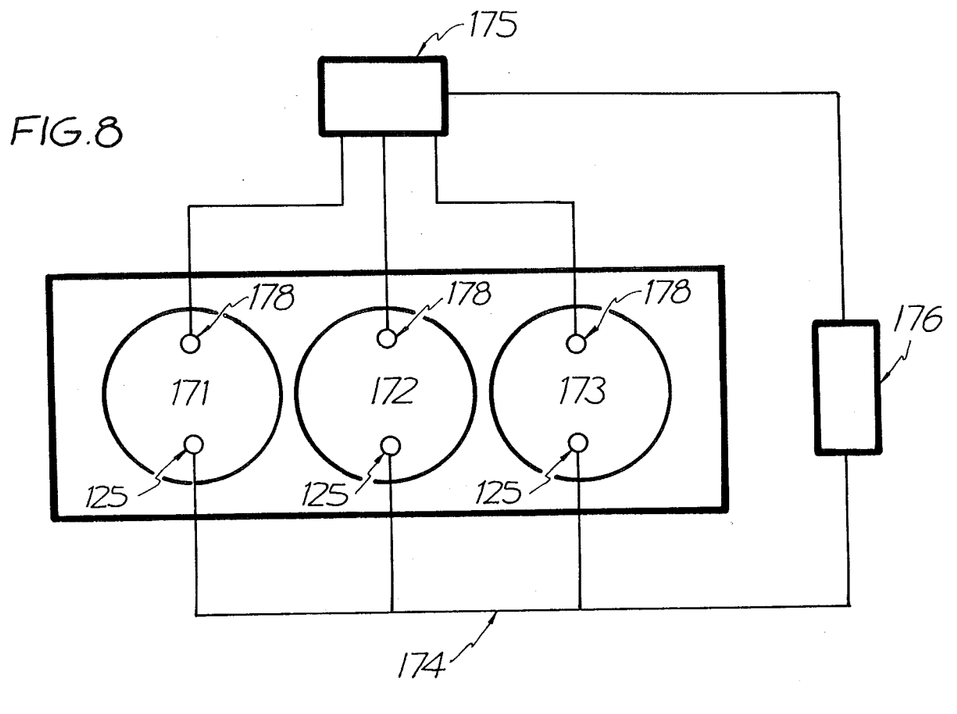
FIG. 8 is a diagramatic representation of a multi-cylinder engine fuel injection system incorporating the device as shown in FIGS. 6 and 7.

One practical arrangement of the invention in the above discussed form is illustrated in FIGS. 6, 7 and 8 of the accompanying drawings.

Referring now to FIGS. 6 and 7, the gas extraction device 125 is of a two part body construction comprising a head portion 130 and a body portion 129 each of generally cylindrical external form and arranged co-axially. The head portion 130 has a series of six passages 132 extending through the full depth thereof from the lower face 133 to the upper face 134. The passages 132 are equally spaced around the axis of the head portion 130 and terminate in the annular recess 135 provided in the upper face 134 of the head portion 130. The annular recess 135 is co-axial with the axis of the head portion 130. The central cavity 136 in the head portion 130 is closed at the upper end by the plug 137 and has a series of radial passages 126 extending from the central cavity 136 to the external peripheral surface of the head portion to provide communication with the water cooling cavity of the cylinder head as hereinafter described.

The body portion 129 has a central bore 138 extending axially through the length thereof, and is adapted at the upper end 139 for coupling in sealed relation to a conduit 140. At the lower end the body portion 129 has an end face 141 parallel to the upper end face 134 of the head portion. An annular spacer ring 142 is located between the faces 134 and 141, the body portion 129 and head portion 130, being held in an assembled co-axial relation with the spacer ring 142 therebetween by the circumferential clamp ring 144. The clamp ring 144 is radially compressed to frictionally engage the external surface of the head portion 130 and body portion 129 to hold them in assembly and co-axial alignment.

The lower face 141 of the body portion 129 is provided with an annular recess 150 which is generally co-axial with and in opposed relation to the recess 135. A series of radial slots 152 are also provided in the face 141, these slots intersecting the annular recess 150 and extending radially inward to communicate with the central bore 138.

Located in the annular gap formed between faces 134 and 141 is a valve ring 155. The valve ring is located within the central opening of the spacer ring 142, with radial clearance therebetween, and also has a lesser axial thickness than the spacer ring 142 so that the valve ring has limited axial movement between faces 134 and 141. The valve ring 155 has a radial width such that it spans the annular recess 135.

It will be appreciated that when the valve ring 155 is seated on the upper end face 134 an area of the valve ring 155 corresponding to the annular area of the recess 135 is exposed to the pressure of the gases within the combustion chamber of the engine, whilst the opposite face of the valve ring is exposed over its total area to the pressure existing within the central bore 138 of the body portion. This is the disposition of the valve ring as seen in FIG. 7 of the drawings.

When the pressure in the combustion chamber is sufficiently higher than that in the central bore 138 so that the upward force on the valve ring, arising from the gas pressure in the annular recess 135, is greater than the force acting on the upper side of the valve ring by reason of the pressure in the central bore 138, the valve ring will lift so as to break contact with the face 134. With the valve ring in this raised open position, gas can pass through the passages 132 and the annular recess 135 to enter the central bore 138.

It will be appreciated that the principle of operation of the valve ring 155 is similar to that of the ring 86 as shown in the embodiment of the invention described with respect to FIGS. 4 and 4a. However, in the current embodiment, the valve ring 155 is not subject to any pressure derived by a regulator spring which substantially controls the pressure at which the valve ring rises to permit gas to enter the central bore 138. In the current embodiment, the position of the valve ring 155 is dependent entirely on the pressure differential existing between the gas in the annular recess 135 and that in the axial bore 138.

In order to fit the above described assembly to the cylinder head of the engine an appropriate stepped cylindrical passageway 151 is formed through the cylinder head to communicate with the interior of the combustion chamber, and also communicate at some relevant point with the cavity provided within the cylinder head for the passage of coolant water, such as the cavity 160 as seen in FIG. 6. The sleeve 161 is a pressed sealed fit into the upper large end 162 of the passage 151 and the body portion 129 is a close sliding fit in the interior of the sleeve 161 with the 'O' ring 162 forming a seal therebetween. In an alternative construction the sleeve may be formed as an integral part of the cylinder head.

The external clamp plate 145 engages the annular shoulder 155 on the body portion 129 and through the clamp bolts 166 the head portion 130 is held against the shoulder 167 in the passage 151 with the compressible sealing element 168 therebetween. It will be appreciated that once the clamp bolts 166 have been tightened, the head portion 130 and the body portion 129 are positively clamped together and thus the securement function of the clamp ring 144 is now redundant. It will therefore be appreciated that the clamping action derived from the clamp ring 144 is only required to hold the relevant components in assembly when not installed in the engine and is not required to withstand the forces derived from the gas pressures existing in the various sections of the device when in use, these pressures being taken by the external clamp plate 145.

As the passage 151 in the cylinder head is in communication with the cooling liquid cavity 160 in the cylinder head, that cooling liquid will have access to pass through the passages 126 and cavity 136 in the head portion 130 to effect cooling thereof. Also, the substantial external recess 165 provided in the body portion 129 will also have access to the cooling liquid and thus provide further cooling of the body portion.

FIG. 8 shows diagramatically a typical gas circuit that may be employed in a three cylinder engine wherein a gas extraction device, as described above with reference to FIGS. 6 and 7, is fitted to each cylinder to provide gas under pressure to effect injection of metered quantities of fuel into respective cylinders of the engine. Each of the three cylinders 171, 172 and 173 are fitted with gas extracting devices 125 which deliver gas into a common conduit 174 which functions as a gas reservoir. As the reservoir is only required to have a relatively small gas capacity appropriate sizing of the duct 174 for this purpose is convenient and cost saving. The supply of gas from the conduit 174 to the fuel injector controller 175 is controlled by the regulator 176 to maintain the pressure of gas at a selected steady pressure. It will be appreciated that when the gas at the controller 175 is at the required pressure the regulator 176 will not allow gas to flow from the conduit 174 to the controller 175 and so the pressure of the gas in the conduit 174 will rise. As a result of this rise in pressure in the conduit 174, the pressure in the central bore 138 of each of the gas extracting devices 125 will similarly rise and thus prevent the valve ring 155 in each of the devices 125 from lifting to permit further gas to flow from the respective cylinders of the engine through the passages 132 into the central bores 138. Upon the pressure of the gas at the controller 175 falling below the required value, the regulator 176 will operate to permit gas to flow from the conduit 174 to the controller 175 and the resulting drop in pressure in the conduit 174 will produce a similar drop in the pressure in the central bores 138, thus permitting the valve rings 155 to lift, and gas to flow from the engine cylinders into the conduit 174.

Gas from the controller 175 at the regulated pressure is supplied to the fuel metering and injection units 178 mounted on the cylinders 171, 172 and 173. The metering and injection units 178 may conveniently be of the form as disclosed in co-pending Australian Patent Application No. 32132/84 in the name of Orbital Engine Co. Pty. Ltd. It is however, understood that other forms of metering and injection units employing gas under pressure to effect the injection of the fuel into the engine may be used in conjunction with any one of the gas extraction devices as herein disclosed and in particular such devices as disclosed with reference to any one of the accompanying drawings.

It will also be readily seen that the device as above described with reference to FIGS. 6 and 7 may be modified to include a central fuel delivery passage and associated valve similar to fuel passage 71 and valve 72 shown in FIG. 4.

Although the invention has been described herein specifically in relation to fuel injection directly into the combustion chambers of engines, it will be appreciated that it is also applicable to fuel injection systems where the fuel is delivered to the engine at its inlet manifold.

The claims defining the invention are as follows:

1. A method of fuel injection for an internal combustion engine having one or more combustion chambers and wherein a metered quantity of fuel entrained in a gas charge is injected directly into each combustion chamber each combustion cycle thereof by the pressure of the gas charge, the method including the steps of delivering gas from at least one combustion chamber of the engine to a gas reservoir, controlling said delivery of gas to said reservoir to substantially maintain the gas in said reservoir above a pressure sufficient to effect direct injection of the fuel into the combustion chambers, and supplying gas at a regulated pressure from said gas reservoir to effect the delivery of the fuel into the combustion chambers.

2. A method of fuel injection for an internal combustion engine having one or more combustion chambers and wherein a metered individual quantity of fuel entrained in a gas charge is injected individually by the pressure of the gas directly into each combustion chamber each combustion cycle thereof, the method including the steps of delivering gas from at least one combustion chamber of the engine to a gas reservoir, controlling said delivery of gas to the gas reservoir to substantially maintain the gas therein at a pressure above the maximum compression pressure in the combustion chamber prior to commencement of combustion in said combustion chamber, and supplying gas at a regulated pressure from said gas reservoir to receive the metered quantity of fuel and effect delivery of that fuel into the respective combustion chamber.

3. A method as claimed in claim 1, wherein the gas is delivered to the gas reservoir from the combustion chamber when the pressure in the combustion chamber is greater than the pressure in the gas reservoir by a predetermined amount.

4. A method as claimed in any one of claims 1 or 3, wherein the value of the gas pressure in the gas reservoir is predetermined and is above the compression pressure in the combustion chamber prior to ignition of the fuel in the combustion chamber.

5. A method as claimed in claim 1 or 2, wherein gas is supplied from the combustion chamber to an intermediate chamber through a fixed size orifice when the pressure in the combustion chamber is above the pressure in the intermediate chamber, and gas from said intermediate chamber is supplied to the gas reservoir.

6. A method as claimed in claim 5, wherein the intermediate chamber is purged of gas from the combustion chamber during that portion of the cycle of the combustion chamber when the pressure in the combustion chamber is below the pressure in the intermediate chamber.

7. A method as claimed in claim 6, wherein purging gas is retained in the intermediate chamber at completion of purging, said purging gas being compressed by the next delivery of gas from the combustion chamber for delivery to the reservoir.

8. A method as claimed in any one of claims 1, 2 or 3, wherein the engine is a multi-cylinder engine, and gas is selectively supplied from a single gas reservoir to effect delivery of fuel to the combustion chamber of each cylinder, and gas from the combustion chamber of at least one of the cylinders is supplied to the gas reservoir.

9. A method of fuel injection for an internal combustion engine having one or more combustion chambers and wherein a metered quantity of fuel entrained in a gas charge is delivered to the engine, the method including the steps of delivering gas from at least one combustion chamber of the engine to a gas reservoir, controlling said delivery of gas to said gas reservoir to substantially maintain the gas in said gas reservoir above a predetermined pressure, and supplying gas at a regulated pressure below said predetermined pressure from said gas reservoir to effect delivery of fuel to the engine.

10. A method as claimed in claim 1 or claim 2, wherein the gas is supplied to the gas reservoir through a variable area orifice and the area of the orifice increases as the pressure differential between the gas reservoir and combustion chamber increases within a predetermined range of said pressure differential.

11. A method of injecting fuel for an internal combustion engine comprising preparing a metered quantity of fuel in accordance with the engine fuel demand, entraining said metered quantity of fuel in a gas charge at a predetermined pressure sufficient to deliver the fuel to the engine, delivering said gas charge and the entrained fuel to the engine in timed relation to the engine cycle, supplying said gas charge from a gas reservoir, delivering gas to said reservoir from at least one combustion chamber of said engine and regulating said delivery of gas from the combustion chamber to maintain the gas in the reservoir substantially at said predetermined pressure.

12. A fuel injection system for an internal combustion engine comprising fuel metering means adapted to prepare a metered quantity of fuel in accordance with the engine fuel demand, means to selectively deliver said metered quantity of fuel to the engine entrained in a charge of gas supplied from a gas reservoir, means to supply gas to said gas reservoir from at least one combustion chamber of the engine, means to control the supply of gas to said reservoir from the combustion chamber to substantially maintain a pressure therein above the pressure required to effect delivery of the fuel to the engine, and means to supply gas from the gas reservoir at a regulated pressure to effect delivery of the fuel to the engine.

13. A fuel injection system for an internal combustion engine having one or more combustion chambers, said system comprising means to prepare individual metered quantities of fuel each entrained in a gas charge and injecting each individual quantity of fuel by the pressure of the gas directly into a respective combustion chamber each combustion cycle thereof, means to supply gas from at least one combustion chamber of the engine to a gas reservoir, means to control said supply of gas to the gas reservoir to substantially maintain the gas therein at a pressure above the maximum compression pressure in the combustion chambers prior to commencement of combustion, and means to supply gas at a regulated pressure from said gas reservoir to receive the metered quantity of fuel and to effect delivery of that fuel into the respective combustion chamber.

14. A fuel injection system as claimed in claim 12 or 13, wherein the means to control said supply of gas to the reservoir are adapted to permit supply when a predetermined pressure differential exists between the combustion chamber and the reservoir.

15. A fuel injection system as claimed in claim 14, wherein said means to control the supply of gas to the reservoir comprises at least one orifice to communicate the combustion chamber with the reservoir, and valve means arranged to open said orifice to admit gas to the reservoir when said predetermined pressure differential exists.

16. A fuel injection system as claimed in claim 15, wherein there is provided a plurality of said orifices, each communicating with an annular recess having an axially directed open side communicating with the reservoir, and said valve means comprises an annular valve member disposed co-axial with the annular recess and axially movable between a position closing said open side of the annular recess and an open position spaced from said open side of the recess, said axial movement being effected by the differential in gas pressure on axially opposite sides of said annular valve member.

17. A fuel injection system as claimed in claim 16, wherein the annular valve member is adapted so the area of the annular valve member exposed to the gas pressure in the annular recess is greater when the annular valve member is in the open position than when in the closed position.

18. A fuel injection system as claimed in claim 16, wherein means are provided to resiliently bias the annular valve member towards the closed position.

19. A fuel injection system as claimed in claim 16, wherein a housing is provided having said orifices and annular recess formed therein and adapted to be mounted on the engine so said orifices communicate with a combustion chamber of the engine, said housing having a fuel delivery passage co-axial with the annular recess to communicate with the combustion chamber, and a valve means operable to control the delivery of fuel from the fuel passage to the combustion chamber.

20. A fuel injection system as claimed in claim 19, wherein the reservoir includes an annular cavity formed in the housing with at least part of said annular cavity extending about the fuel passage.

21. A fuel injection system as claimed in claim 16, wherein means are provided to apply a force to the annular valve member responsive to the pressure of the gas reservoir to supplement the force developed by said pressure in the reservoir acting directly on the annular valve element to hold it in the closed position.

22. A fuel injection system as claimed in claim 12 or 13, wherein the means to supply gas to the gas reservoir includes:
a compression chamber;
an engine gas port to communicate the compression chamber with an engine combustion chamber, a valve adapted to open said engine gas port when the combustion chamber pressure exceeds the compression chamber pressure by a predetermined differential;
an air port to communicate the compression chamber with an air source, a one way air valve to permit air to enter said compression chamber from said air source;
a delivery port to communicate the compression chamber with the gas reservoir, a pressure responsive valve controlling flow through said delivery port to open said delivery port when the pressure in the gas reservoir is below a predetermined level; and
a restricted bleed port communicating said compression chamber with ambient the arrangement being such that when the gas pressure in the combustion chamber exceeds the pressure of the air supply, air in the compression chamber is compressed for delivery to the gas reservoir, and the air source delivers air to the compression chamber when the engine gas valve is closed to purge engine gas from the compression chamber through the bleed port.

23. A two stroke cycle internal combustion engine wherein fuel is delivered to the combustion chamber or chambers thereof, by the method as claimed in any one of claims 1, 2, 9 or 11.

24. A two stroke cycle internal combustion engine wherein the fuel injection system as claimed in any one of claims 12 or 13 is used to deliver fuel to the combustion chamber or chambers thereof.

25. An automobile engine wherein fuel is delivered to the combustion chamber or chambers thereof by the method as claimed in any one of claims 1, 2, 9 or 11.

26. An automobile engine wherein the fuel injection system as claimed in any one of claims 12 or 13 is used to deliver fuel to the combustion chamber or chambers thereof.

27. A marine engine wherein fuel is delivered to the combustion chamber or chambers thereof by the method as claimed in any one of claims 1, 2, 9 or 11.

28. A marine engine wherein the fuel injection system as claimed in any one of claims 12 or 13 is used to deliver fuel to the combustion chamber or chambers thereof.

29. An outboard marine engine wherein fuel is delivered to the combustion chamber or chambers thereof by the method as claimed in any one of claims 1, 2, 9 or 11.

30. An outboard marine system wherein the fuel injection system as claimed in any one of claims 12 or 13 is used to deliver fuel to the combustion chamber or chambers thereof.

* * * * *